(12) United States Patent
Oguri

(10) Patent No.: US 7,969,620 B2
(45) Date of Patent: Jun. 28, 2011

(54) IMAGE READER AND METHOD OF CALIBRATING THEREOF

(75) Inventor: Hirofumi Oguri, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 1148 days.

(21) Appl. No.: 11/682,728

(22) Filed: Mar. 6, 2007

(65) Prior Publication Data

US 2007/0206237 A1    Sep. 6, 2007

(30) Foreign Application Priority Data

Mar. 6, 2006 (JP) ................................. 2006-060112

(51) Int. Cl.
   *H04N 1/00* (2006.01)
(52) U.S. Cl. .................. 358/406; 358/447; 358/504
(58) Field of Classification Search .................. 358/1.9, 358/1.15, 406, 447, 474, 505, 486; 399/1, 399/151; 396/125; 369/59.16; 257/294
   See application file for complete search history.

(56) References Cited

U.S. PATENT DOCUMENTS

| 5,144,686 | A | * | 9/1992 | Takashi et al. ................ 358/447 |
| 5,572,282 | A | * | 11/1996 | Uchiyama ...................... 396/125 |
| 6,185,007 | B1 | * | 2/2001 | Hayashi et al. ................ 358/1.9 |
| 6,198,711 | B1 | * | 3/2001 | Fujita et al. ................ 369/59.16 |
| 6,388,777 | B1 | * | 5/2002 | Miyajima ...................... 358/486 |
| 6,407,418 | B1 | * | 6/2002 | Haga et al. .................... 257/294 |
| 2002/0043674 | A1 | * | 4/2002 | Haga et al. .................... 257/294 |
| 2002/0067925 | A1 | * | 6/2002 | Yamano ............................ 399/1 |
| 2002/0149799 | A1 | * | 10/2002 | Hayashi ........................ 358/406 |
| 2003/0038989 | A1 | * | 2/2003 | Yokota et al. ................. 358/474 |
| 2004/0218235 | A1 | * | 11/2004 | Kawano ......................... 358/505 |
| 2005/0083543 | A1 | * | 4/2005 | Suzuki et al. .................. 358/1.9 |
| 2009/0190174 | A1 | * | 7/2009 | Hiramatsu .................... 358/1.15 |

FOREIGN PATENT DOCUMENTS

| JP | H10-327321 A | 12/1998 |
| JP | H11-177836 A | 7/1999 |
| JP | 2002-218225 A | 8/2002 |
| JP | 2003-179757 A | 6/2003 |
| JP | 2005-117219 A | 4/2005 |

OTHER PUBLICATIONS

Japan Patent Office; Notice of Reasons for Rejection in Japanese Patent Application No. 2006-060112 (counterpart to the above-captioned U.S. patent application) mailed Nov. 11, 2009.
Japan Patent Office; Notice of Reasons for Rejection in Japanese Patent Application No. 2006-060112 (counterpart to the above-captioned U.S. Patent Application) mailed Jun. 26, 2009.

* cited by examiner

*Primary Examiner* — Twyler L Haskins
*Assistant Examiner* — Nicholas C Pachol
(74) *Attorney, Agent, or Firm* — Baker Botts L.L.P.

(57) ABSTRACT

An image reader includes an image sensor including a plurality of light receiving elements. The plurality of light receiving elements receive a reflection light from a document and perform photoelectric conversion. The image reader further includes an MTF calculation portion which calculates an MTF of the image sensor based on image data which is obtained by reading a predetermined MTF detection pattern. Moreover, the image reader includes an image processing portion which divides the plurality of light receiving elements into a first MTF region and a second MTF region. The image processing portion performs a first image process on the plurality of image signals which are outputted from the light receiving elements in the first MTF region and a second image process on the plurality of image signals which are outputted from the light receiving elements in the second MTF region.

18 Claims, 13 Drawing Sheets

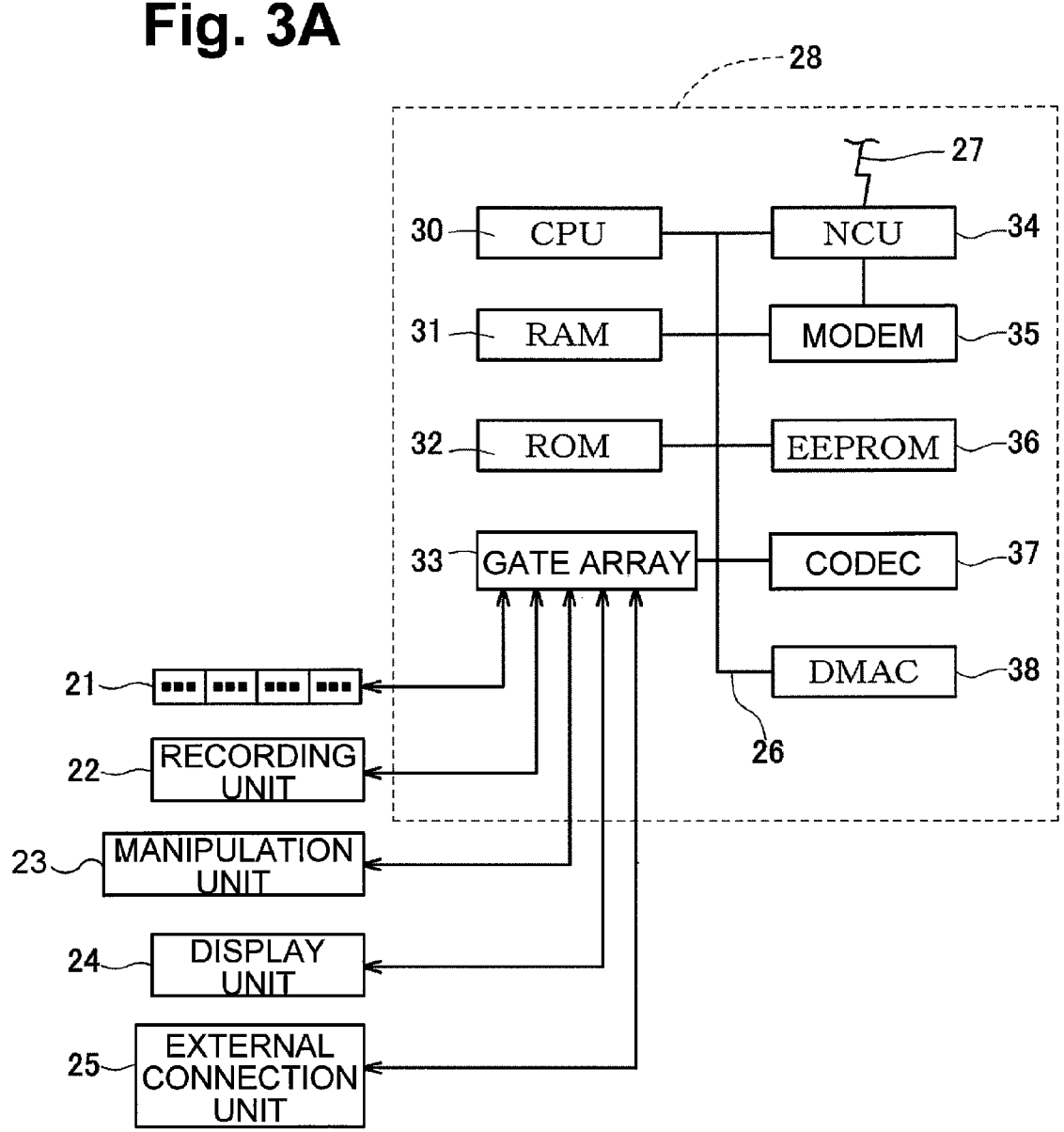

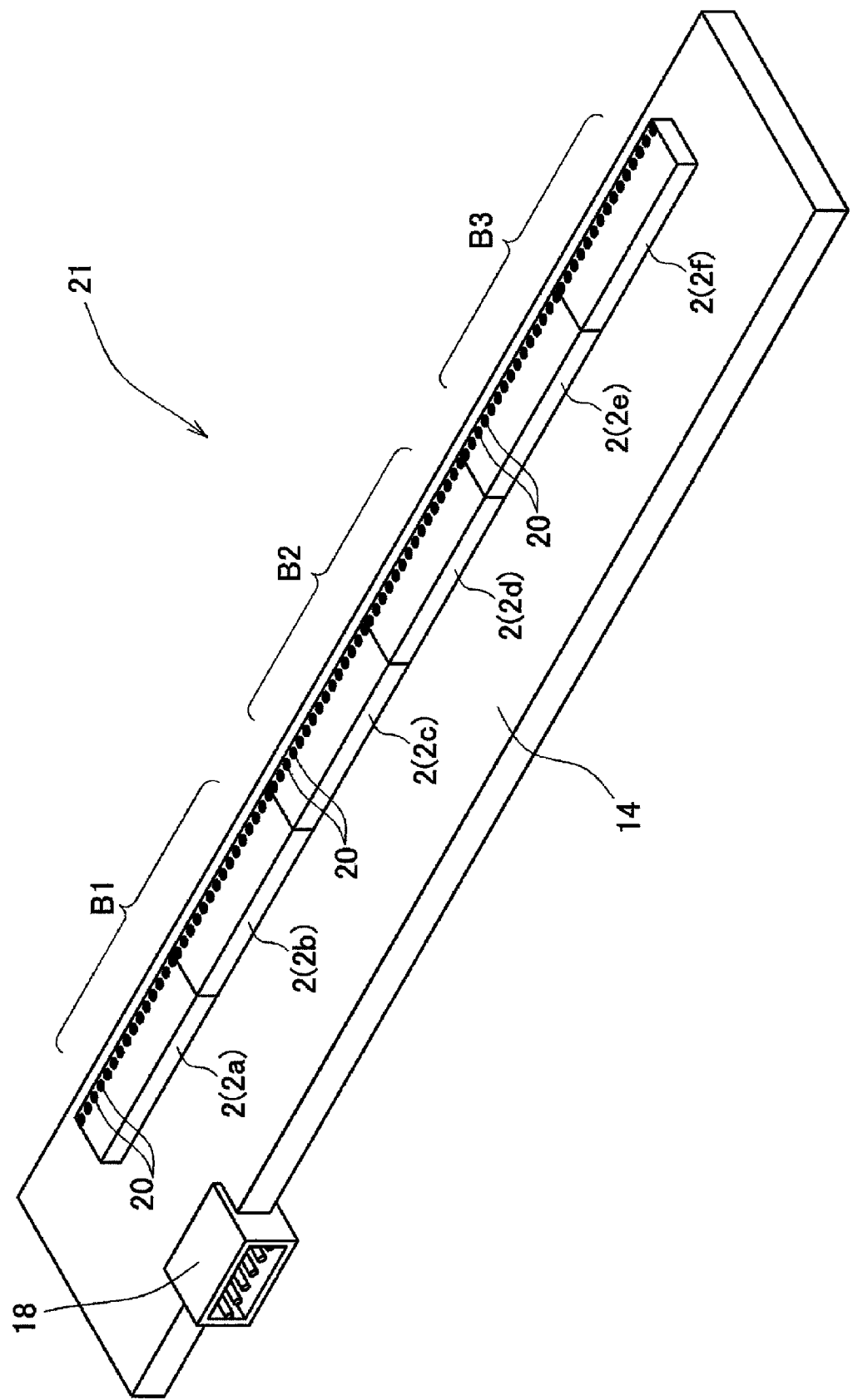

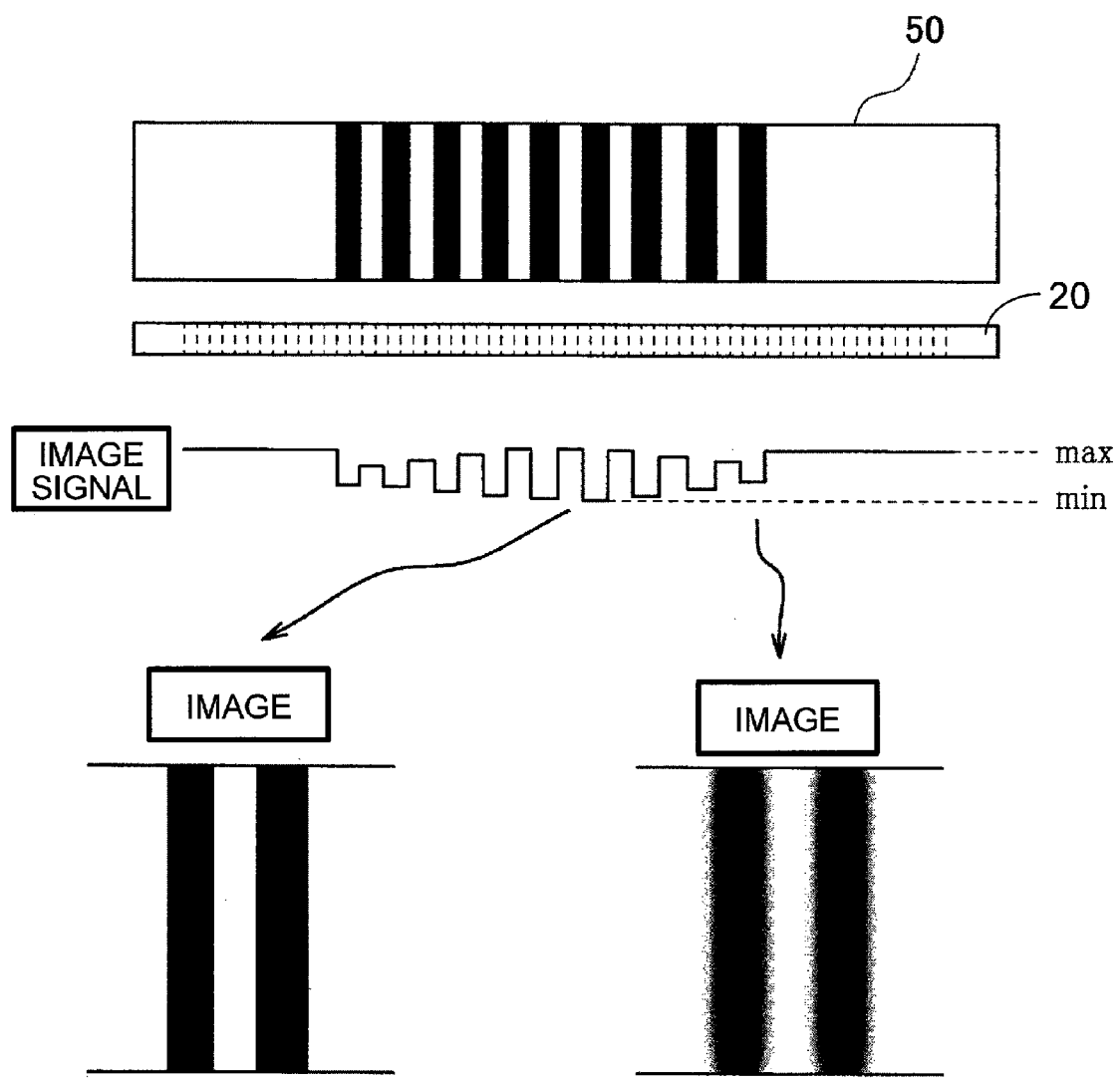

Fig. 10A

| MATRIX COEFFICIENT | | |
|---|---|---|
| n11 | n12 | n13 |
| n21 | n22 | n23 |
| n31 | n32 | n33 |

Fig. 10B

| PIXEL DATA VALUE | | |
|---|---|---|
| p11 | p12 | p13 |
| p21 | p22 | p23 |
| p31 | p32 | p33 |

Fig. 10C $$P = \left( \frac{\sum_{i=1}^{3} \sum_{j=1}^{3} (pij \times nij)}{\sum_{i=1}^{3} \sum_{j=1}^{3} (nij)} \right)$$

IMAGE READER AND METHOD OF CALIBRATING THEREOF

CROSS REFERENCE TO RELATED APPLICATION

The present application claims priority from Japanese Patent Application No. 2006-060112, filed on Mar. 6, 2006, the disclosure of which is incorporated herein by reference in its entirety.

FIELD OF THE INVENTION

The present invention relates generally to image readers and methods of calibrating thereof.

BACKGROUND OF THE INVENTION

A known image reader for reading a document is mounted on a facsimile, a copier, a scanner, or any combination thereof. In the known image reader, an image sensor includes light receiving elements which are linearly arranged. The image sensor receives a reflection light from the document, and performs photoelectric conversion. A close-contact-type image sensor ("CIS") is one type of image sensor which is popular because it is relatively lightweight and may be manufactured at a reduced cost. Nevertheless, because a focal length of the close-contact-type image sensor is relatively short, when a lens mounting portion exhibits poor flatness, the resolution is deteriorated. Moreover, when a distance from a lens surface to a platen is individually adjusted for each image reader, the number of manufacturing steps and the manufacturing cost increases.

It is known that an image reader may calculate a Modulation Transfer Function ("MTF"), i.e., the change of contrast of a sinusoidal pattern image expressed as a function of spatial frequency, based on a maximum value and a minimum value of image data read from a stripe band, and may determine an edge emphasis gain and a smoothing coefficient based on a result of the calculation. Consequently, the MTF of an image may be enhanced without increasing the accuracy of mechanical members and without individually adjusting the distance from the leis surface to the platen for each image reader.

Nevertheless, in the known image reader, the edge emphasis is performed or the smoothing coefficient is determined uniformly with respect to the entire close-contact-type image sensor. Therefore, when accurate focusing is not obtained partially, the accurate focusing may not be performed at such a portion, or the accurate focusing may not be performed at any portions.

Moreover, the close-contact-type image sensor of an A3 size or the like uses a thick and rigid frame for preventing the frame from warping. Specifically, when the image sensor comprises a frame comprising plastic, which is light weight and has a low rigidity, the accurate focusing is not obtained partially because of warping. Accordingly, the image sensor comprises thick and rigid frame. Nevertheless, such a frame is not suitable for miniaturized, light weight close-contact-type image sensor.

SUMMARY OF THE INVENTION

Therefore, a need has risen for image readers which overcome these and other short comings of tie related art. A technical advantage of the present invention is that a distance from a surface of a close-contact-type image sensor to a platen may not need to be individually adjusted for each image reader. Another technical advantage of the present invention is that a region may be partially corrected when the resolution is deteriorated.

According to an embodiment of the present invention, an image reader comprises an image sensor comprising a plurality of light receiving elements arranged in the main scanning direction. The plurality of light receiving elements receive a reflection light from a document and perform a photoelectric conversion to convert the reflection light into a plurality of image signals. The image reader further comprises an MTF calculation portion which calculates an MTF of the image sensor based on image data which is obtained by reading a predetermined MTF detection pattern by the image sensor. Moreover, the image reader comprises an image processing portion which, based on the MTF calculated by the MTF calculation portion, divides the plurality of tight receiving elements into a first MTF region in which the MTF is greater than a first predetermined MTF value and a second MTF region in which the MTF is less than a second predetermined MTF value, and performs a first image process on the plurality of image signals which are outputted from the light receiving elements in the first MTF region and a second image process on the plurality of image signals which are outputted from the light receiving elements in the second MTF region.

According to another embodiment of the present invention, a method of calibrating an image reader comprises a step of receiving, at a plurality of light receiving elements of an image sensor, a reflection light from a document and a step of performing a photoelectric conversion to convert the reflection light into a plurality of image signals. The method further comprises a step of reading a predetermined MTF detection pattern by the image sensor and a step of calculating an MTF of the image sensor based on an image data corresponding to the predetermined MTF detection pattern. Moreover, the method further comprises a step of dividing the plurality of light receiving elements into a first MTF region in which the MTF is greater than a first predetermined MTF value and a second MTF region in which the MTF is less than a second predetermined MTF value. The method still further comprises a step of performing a first image process on the plurality of image signals which are outputted from the light receiving elements in the first MTF region and a step of performing a second image process on the plurality of image signals which are outputted from the light receiving elements in the second MTF region.

Other objects, features, and advantages will be apparent to persons of ordinary skill in the art from the following detailed description of the invention and the accompanying drawings.

BRIEF DESCRIPTION OF THE DRAWINGS

For a more complete understanding of the present invention, the needs satisfied thereby, and the features and technical advantages thereof, reference now is made to the following descriptions taken in connection with the accompanying drawings.

FIG. 3A is a block diagram of a control portion of the multi-function machine.

FIG. 4 is a perspective view of a close-contact-type image sensor.

FIG. 8 is an explanatory view of a relationship between a stripe and image output.

FIGS. 10A-10C are explanatory views of principles of emphasis processing and smoothing processing.

DETAILED DESCRIPTION OF THE EMBODIMENTS

Embodiments of the present invention and their features and technical advantages may be understood by referring to FIGS. 1-13, like numerals being used for like corresponding portions in the various drawings.

Figure 1:
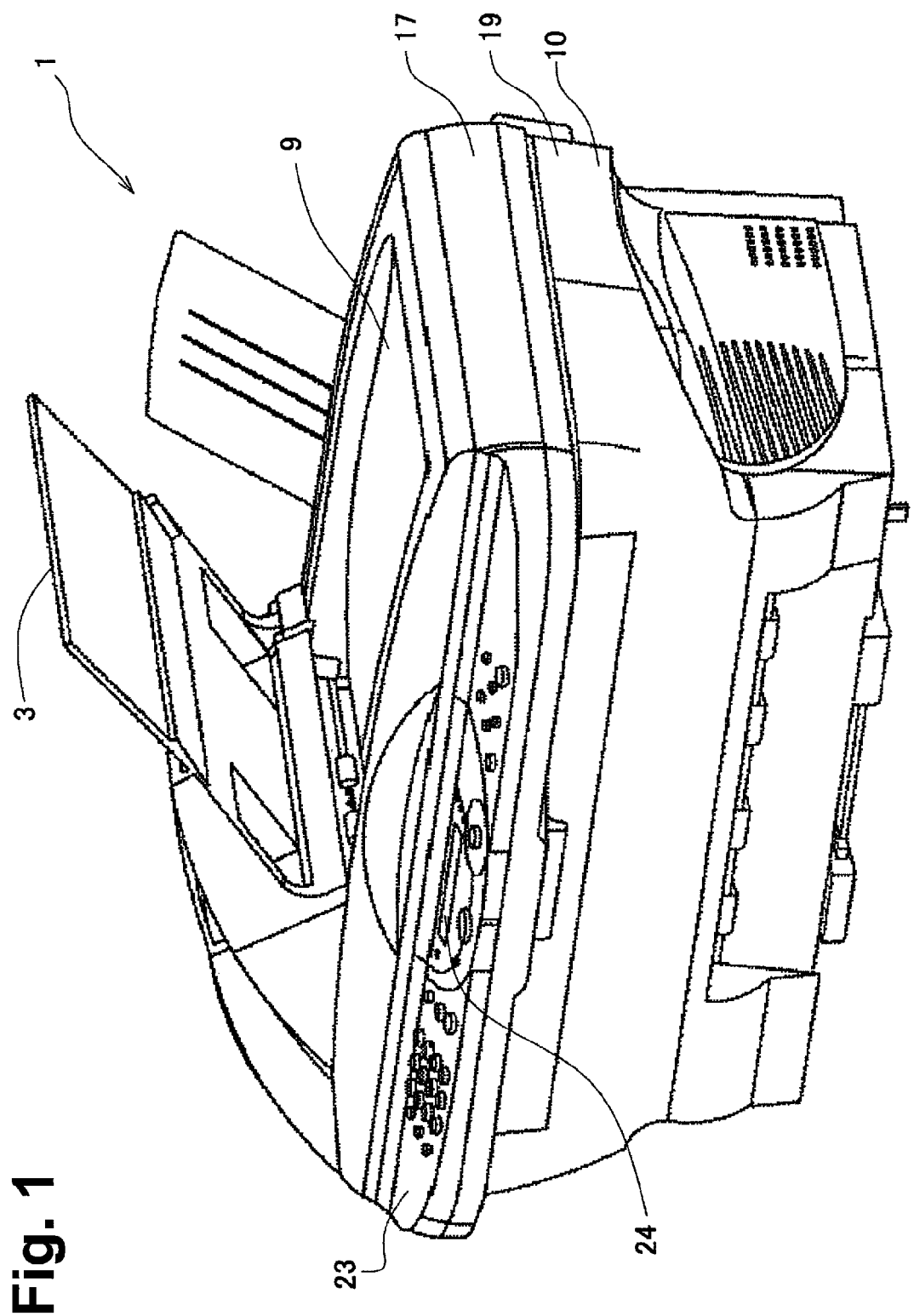
FIG. 1 is a perspective view of a multi-function machine which comprises an image reader, according to the present invention.
Figure 2A:
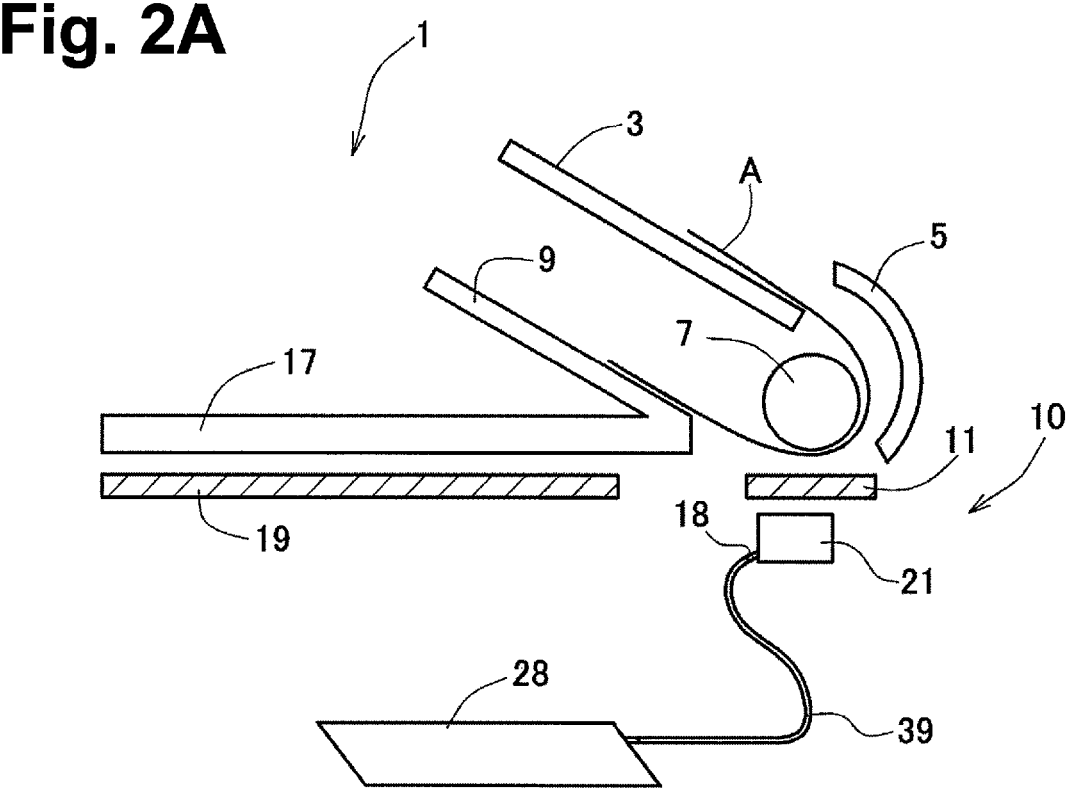
FIG. 2A is an operation explanatory view when an ADF reading mechanism is operated.
Figure 2B:
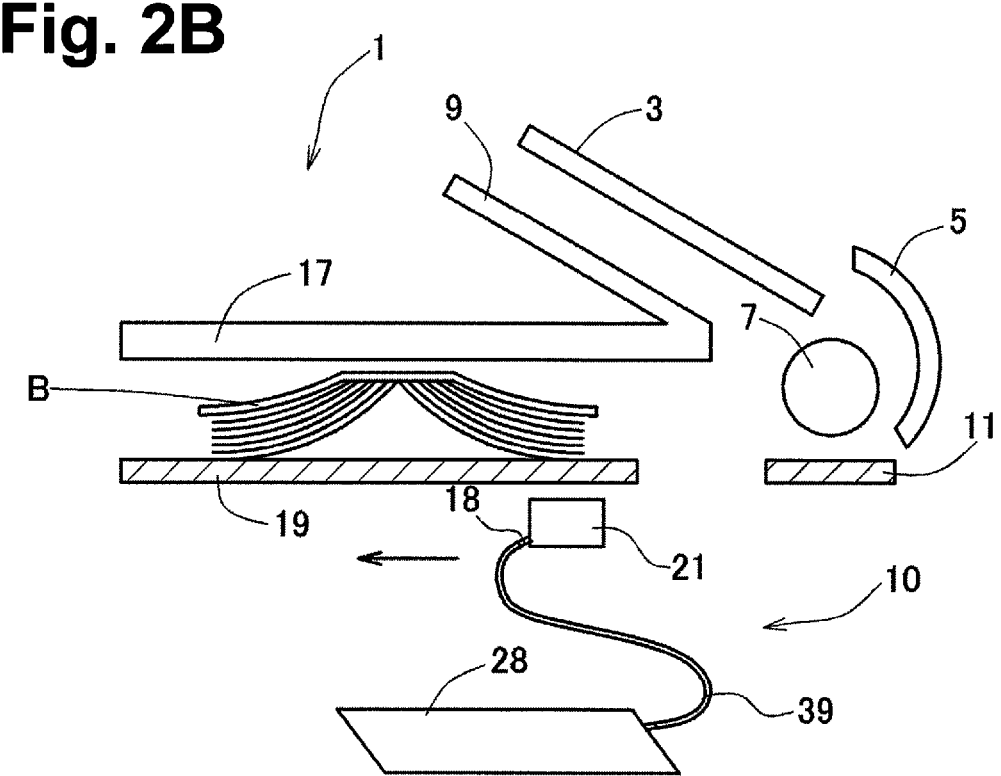
FIG. 2B is an operation explanatory view when an FB reading mechanism is operated.

Referring to FIG. 1 and FIG. 2, a multi-function machine 1 may be configured to perform a plurality of functions, such as a fax unction, a scanning function, a copying function, or any combination thereof. The multi-function machine 1 may comprise an ADF reading mechanism which comprises an auto document feeder ("ADF") document set tray 3, an document guide 5, a paper feed roller 7, an ADF document discharge tray 9, a contact glass 11, and a close-contact-type image sensor 21 housed in a frame 49. The multi-function machine 1 also may comprise a flat bed ("FB") reading mechanism comprising a FB pushing plate 17, a glass FB platen 19, and the close-contact-type image sensor 21.

Referring to FIG. 2A, a document A may be positioned on the ADF document set tray 3, and when reading is initiated, the document A is conveyed with the rotation of the paper feeding roller 7, and the document A passes on the contact glass 11. The close-contact-type image sensor 21 may be positioned directly below the contact glass 11, and may read an image of the document A via the contact glass 11. Moreover, a document B may be positioned on an FB platen 19, and when reading is initiated in a state that the document B is pushed to the FB platen 19 by the FB pushing plate 17, the close-contact-type image sensor 21 performs reading of the image of the document B while moving in the direction as indicated by an arrow in FIG. 2A.

Referring to FIG. 3A, a main board 28, which may be incorporated in the inside of a body of the multi-function machine 1, may comprise a CPU 30, a RAM 31, a ROM 32, a gate array 33, an Network Control Unit ("NCU") 34, a modem 35, an EEPROM 36, a CODEC 37, a Direct Memory Access Controller 38 ("DMAC"), and the like. These members may be connected to each other through a bus line 26. The bus line 26 may comprise an address bus, a data bus, and control signal lines. Further, the close-contact-type image sensor 21, a recording unit 22, a manipulation unit 23, a display unit 24, and an external connection unit 25 may be connected to the gate array 33. A telephone line 27 may be connected to the NCU 34.

The NCU 34 may perform a network control of the line, such as the connection/disconnection of the line, and the RAM 31 may be an operation region of the CPU, such as a line buffer memory of a read image or the like. The MODEM 35 may perform the modulation, the demodulation, or the like of the facsimile data. The ROM 32 may store data, such as predetermined values, and the various programs shown in FIG. 3B, and the EEPROM 36 may store various flags, configuration information, or the like. Moreover, EEPROM 36 may store region information indicating which region of the close-contact-type image sensors 21 on which an emphasis processing or a smoothing processing is to be performed. When a user operates the multi-function machine 1 to read an image on a document, the CPU 30 may read the information and performs the emphasis or smoothing process based on an image processing program 32c. The gate array 33 acts as an input/output interface between the CPU 30 and respective portions, such as the close-contact-type image sensor 21, and the CODEC 37 performs coding and decoding of the facsimile data. The DMAC 38 reads the data from the RAM 31 and writes the data to the RAM 31.

The recording unit 22 may comprise a laser printer, and may record images on a recording paper. The manipulation unit 23 may transmit a manipulation signal to the CPU 30 in response to a user's operation of a manipulation button. The display unit 24 may comprise a Liquid Crystal Display ("LCD") or the like, and may display an operational state of the multi-function machine 1. The external connection unit 25 may connect an external device, such as a personal computer, to the multi-function machine 1.

Figure 3B:
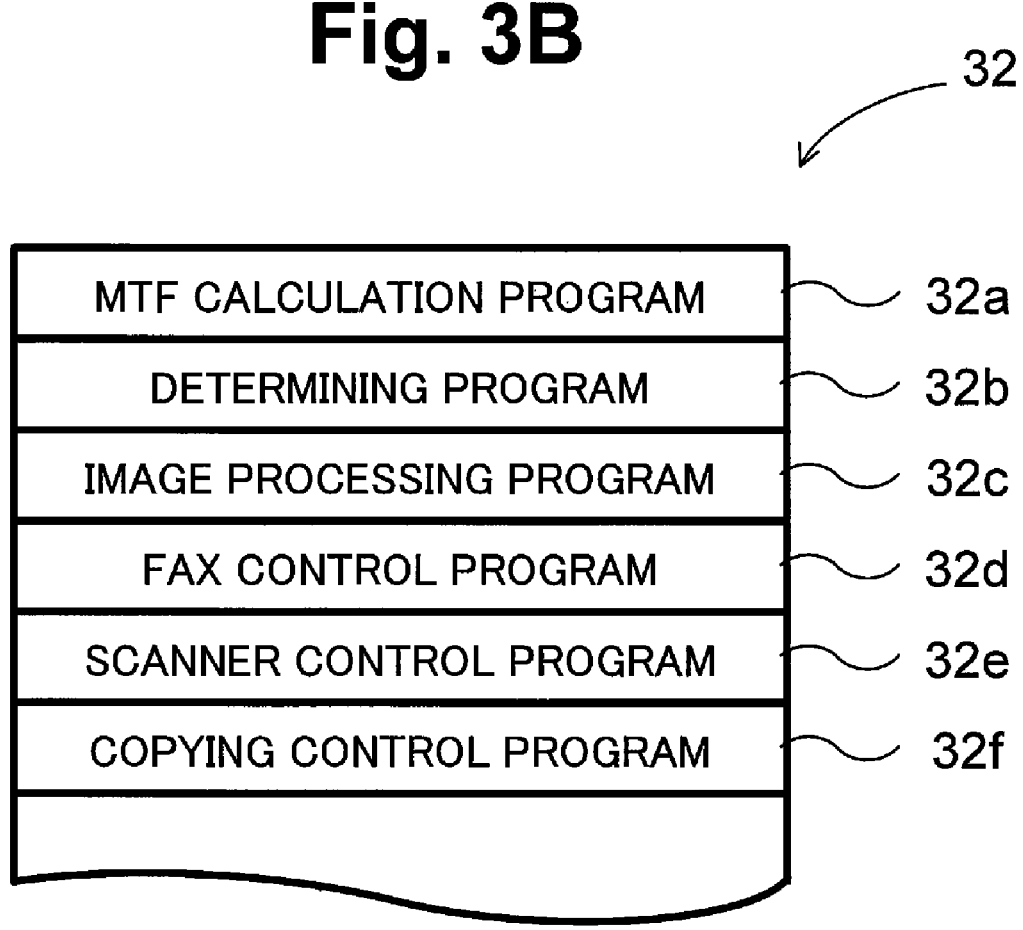
FIG. 3B is an explanatory view of a memory region of a ROM of the control portion.
Figure 5:
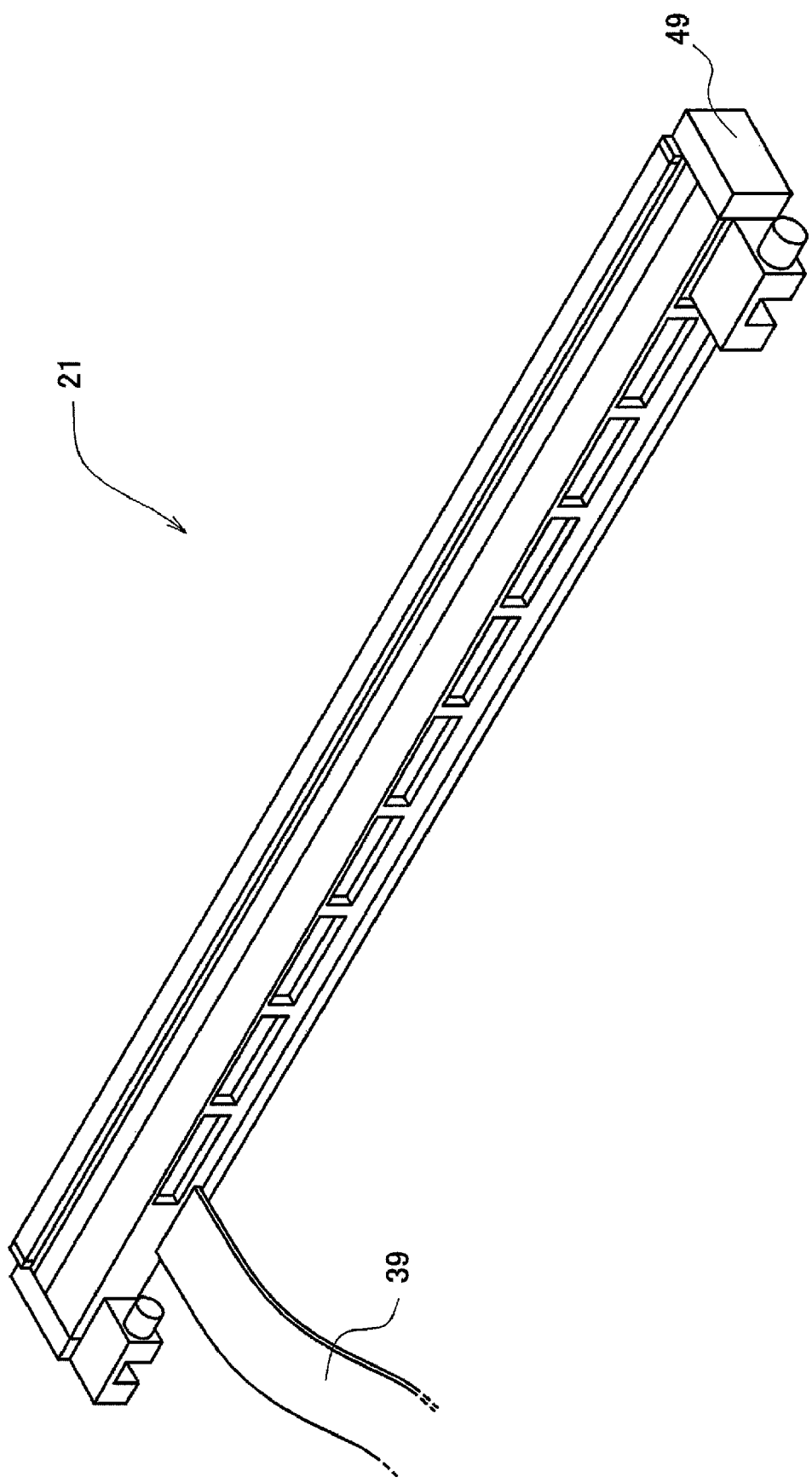
FIG. 5 is a perspective view of a frame.
Figure 6:
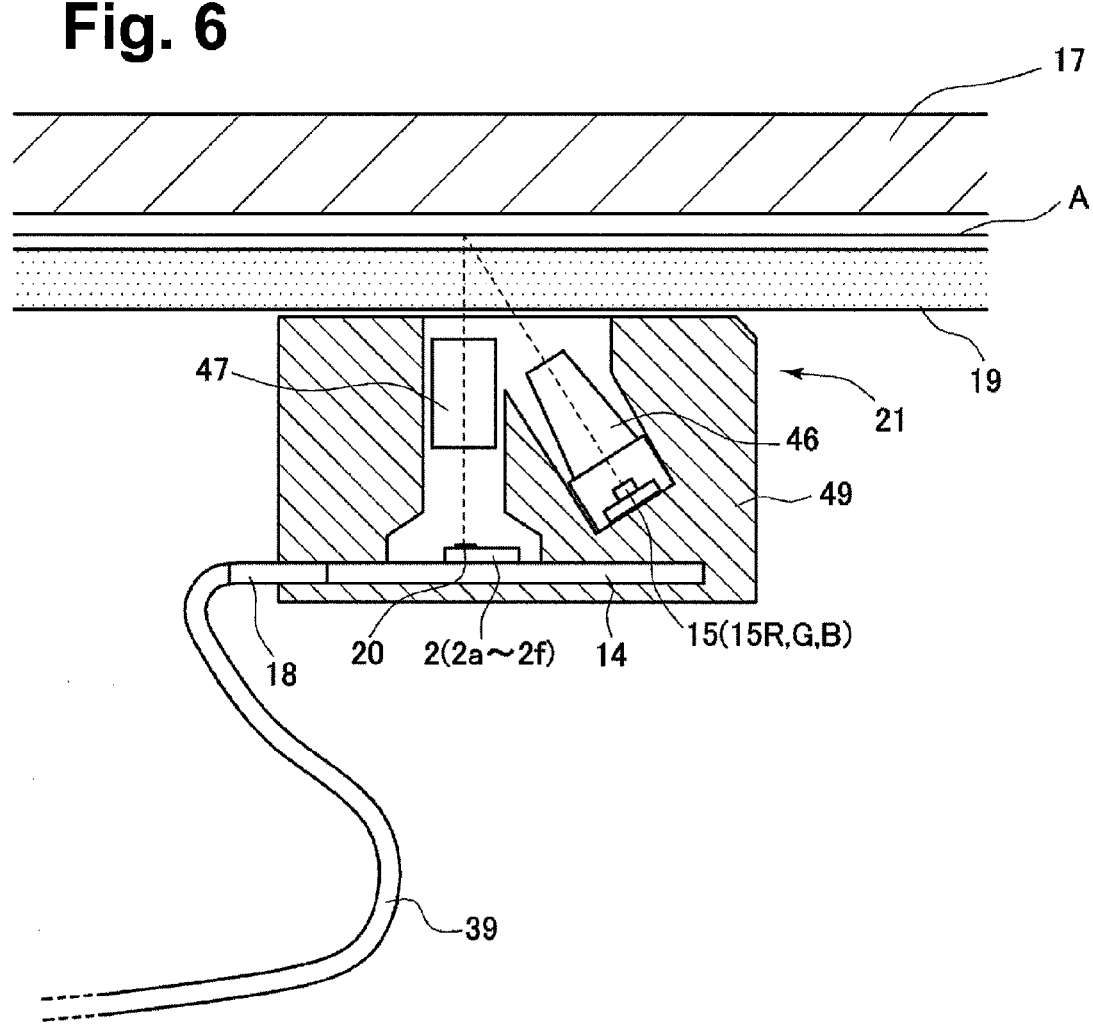
FIG. 6 is a cross-sectional view of a frame.

Referring to FIG. 3B, the ROM 32 may store various programs, such as an MTF calculation program 32a, a determining program 32b, an image processing program 32c, a facsimile control program 32d, a scanner control program 32e, or a copying control program 32f, or any combination thereof. The MTF calculation program 32a may enable the close-contact-image sensor 21 to read an MTF detection pattern 50, and may calculate an MTF based on the read image data. Moreover, the determining program 32b may determine whether the calculated MTF is greater than or less than a predetermined range and may divide a plurality of light receiving elements 21 into a first MTF region in which an MTF is greater than a first predetermined value, and a second MTF region in which the MTF is less than a second predetermined value. Then, the image processing program 32c may apply the emphasis process to image signals which are outputted from the light receiving elements in the second MTF region to increase the MTF. In another embodiment, the image processing program 32c may not apply the emphasis process to image signals which are outputted from the light receiving elements in the second MTF region, and instead may apply the smoothing process to the image signals to decrease MTF. In yet another embodiment, the image processing Program 32c may not alter the image signals. The CPU 30, the MTF calculation program 32a, and the image processing program 32c may correspond to the MTF calculation portion and the image processing portion. Moreover, the FAX control program 32d, the scanner control program 32e, and the copying control program 32f may perform the facsimile function, the scanning function, and the copying function, respectively.

Referring to FIG. 4, the close-contact-type image sensor 21 may comprise a plurality of sensor IC chips 2, and light receiving elements 20 may be linearly mounted on IC chips 2 which may be arranged on a substrate 14. The light receiving elements 20 may be arranged in a row at a fixed interval in the main scanning direction, and referring to FIGS. 5 and 6, the close-contact-type image sensor 21 may be held by a frame 49. Moreover, referring to FIG. 6, a light source 15 comprising, e.g., LEDs or the like, a light guide unit 46, and a lens array 47 may be positioned within the frame 49. The light source 15 may comprise light emitting elements 15R, 15G, and 15B which emit light of red, green, and blue, respectively and consequently, white light may be extracted from the light source. The light emitted from the light source 15 may pass through the light guide unit 46 and the FB platen 19, and may be radiated to the document A. The light reflected by the document A may pass through the FB platen 19 and the lens array 47, and reaches the light receiving elements 20. The light receiving elements 20 may output the received light as image signals by performing photoelectric conversion. The image signals may be transmitted to the multi-function machine body 1 via a connector 18 and a flexible flat cable 39.

The frame 49 may comprise a resin and tray have a size which enables a document of A3 size to be read. The frame 49 may be manufactured at a reduced cost, and may be relatively light weight. The image reader also may comprise an MTF calculation portion and an image processing portion which may perform image processing in a region corresponding to the calculation result of MTF.

For example, referring to FIG. 4, a plurality of sensor IC chips 2, e.g., IC chips 2a-2f, may be divided in to a first block B1, a second block B2, and a third block B3, and each of the blocks may comprise two of the sensor IC chips 2 and may be positioned in a row. A wiring pattern (not shown) may be formed on a surface of the substrate 14, and one end of the wiring pattern may be connected to the connector 18 formed on one peripheral side of the substrate 14. The supply of electricity to the sensor IC chips 2 from the outside of the substrate 14 and the inputting/outputting of various signals to the sensor IC chips 2 may be performed via a flexible flat cable 39 which is connected to the connector 18. Further, the flexible flat cable 39 may have a length sufficient to absorb a movable distance of the close-contact-type image sensor 21, and may have another end connected to the main board 28.

Figure 11:
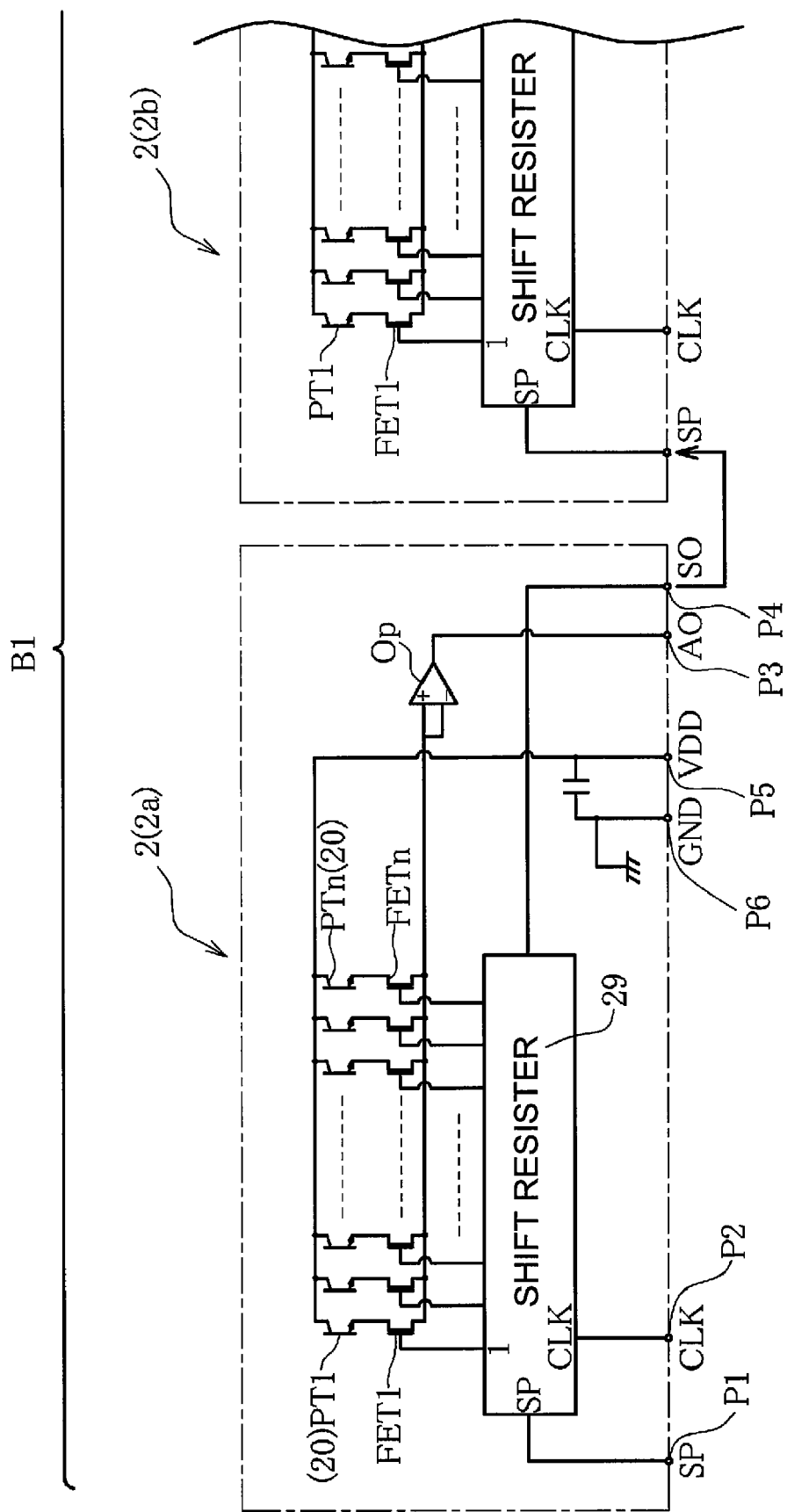
FIG. 11 is a plan diagram of the close-contact-type image sensor.

Referring to FIG. 11, the sensor IC chip 2 may comprise photo transistors PT1-PTn which may comprise a predetermined number of light receiving elements 20, e.g., 5,000 light receiving elements 20. The photo transistors PT1 to PTn may receive light and store charges corresponding to the received light quantities. Further, the plurality of IC chips 2 may be positioned on a front surface of the substrate 14, such that the IC chips 2 are arranged in the row direction of the plurality of the light receiving elements 20.

Figure 12:
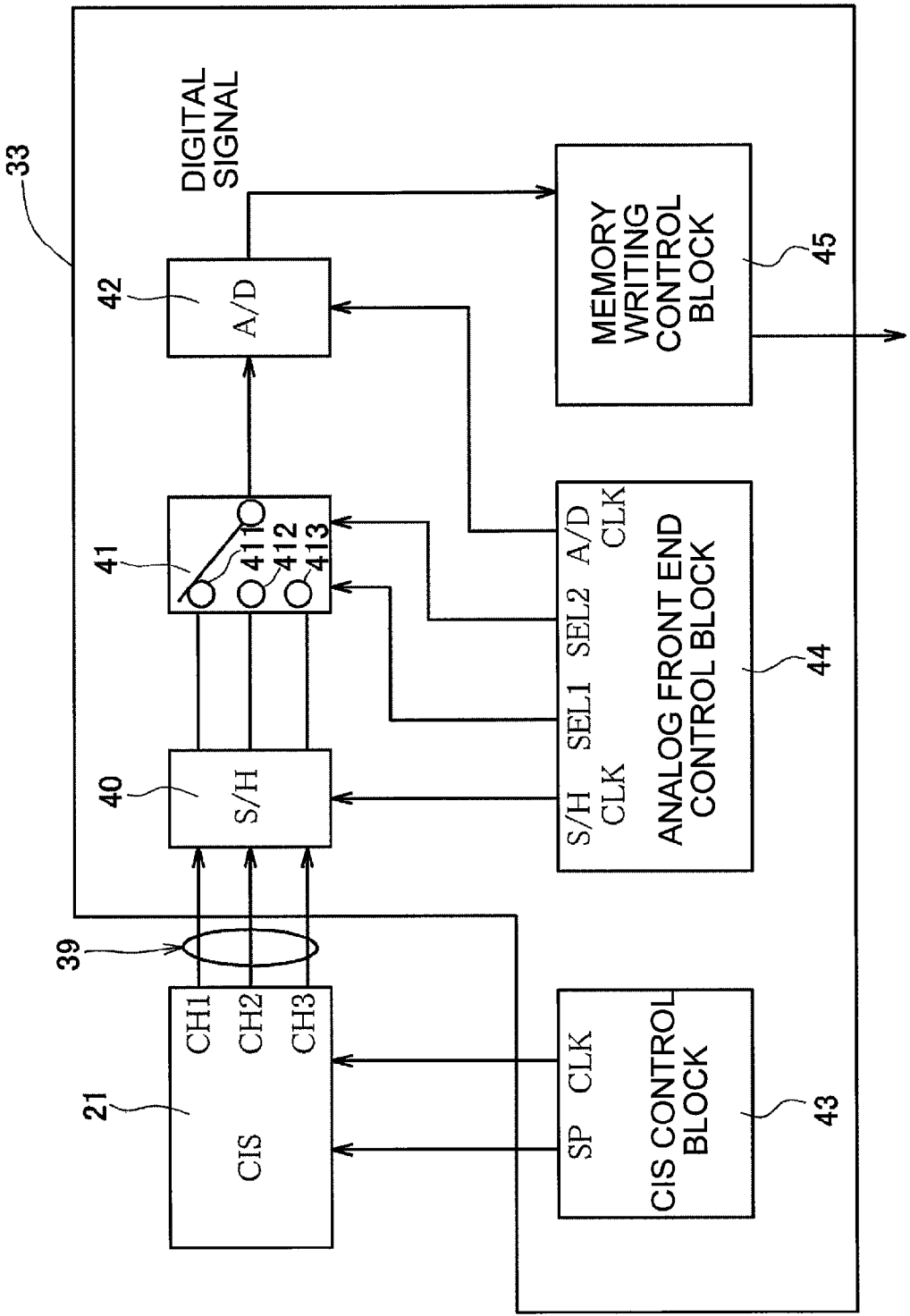
FIG. 12 is an explanatory view of a flow of signals from the close-contact-type image sensor.

Referring to FIG. 12, the gate array 33 may comprise a CIS control block 43 which supplies a start pulse SP, a clock signal CLK, or the like, to the close-contact-type image sensor 21 under a systematic control of the CPU 30. The gate array 33 also may comprise an analog front end ("AFE") circuit, which may comprise of a sample holding circuit (S/H) 40, a multiplexer 41, and an analog/digital converter (A/D) 42, an AFE control block 44 which transmits various control signals to the AFE circuit, a memory writing control block 45 which samples and sequentially writes digital signals outputted from the analog/digital converter 42 into a predetermined region of an image memory contained in the RAM 31, or the like.

The start pulse SP may be divided and inputted to a plurality of sensor IC chips 2, e.g., sensor IC chips 2a, 2c, and 2e, which are respectively positioned at the left side of the blocks B1-B3. For example, referring to FIG. 11, a serial out signal SO may be outputted from a terminal P4 of the left sensor IC chip 2, e.g., sensor IC chip 2a, to the sensor IC chip 2 at the right of the block B1, e.g., sensor IC chip 20, and the driving of the left sensor IC chip 2 may begin upon the inputting. The operation of sensor IC chips 2c-2e may be substantially similar to sensor IC chips 2a and 2b, respectively. After the left sensor IC chips 2a, 2c, 2e are driven, the right sensor IC chips 2b, 2d, and 2f may be driven. In this embodiment, the clock signal CLK which is transmitted from the gate array 33 may be divided and inputted to sensor IC chips 2a-2f.

When the user uses manipulation unit 23 to initiate an operation upon the document, the start pulse SP outputted from the gate array 33 is inputted to a terminal P1, and a shift register 29 sequentially brings a plurality of transistors FET1-FETn into an ON state in the predetermined direction in response to the clock signal CLK inputted to a terminal P2. Then, charges which are stored in the plurality of phototransistors PT1-PTn are discharged in a predetermined order, are amplified by an amplifier Op, and are outputted in series from a terminal P3 as image signals AO, e., analog image signals. The sensor IC chip 2 also may comprise a terminal P4 which outputs a serial out signal SO when the image signal is outputted from the final phototransistor PTn. Further, the sensor IC chip 2 may comprise a voltage VDD which applies to the terminal P5 for supplying a drive electricity for operating the respective portions of the sensor IC chip 2 and a terminal P6 which is connected to a ground GND.

For example, when the start pulse SP is inputted to the terminal P1 of the sensor IC chip 2a, the image signal AO is outputted from the terminal P3 in response to the clock signal CLK. After the FETn assumes an ON state in response to the clock signal CLK, the serial out signal SO is outputted and then is inputted as the start pulse SP to the sensor IC chip 2b. Then, the image signal of the sensor IC chip 2b is outputted from the output terminal Ch1.

Referring to FIG. 12, respective analog read signals outputted from respective output terminals Ch1-Ch3 of blocks B1-B3 may be transmitted to the gate array 33 via the flexible flat cable 39, and may be temporarily stored in the sample holding circuit 40 until the respective image signals reach a stable state at predetermined output levels. Thereafter, the analog read signals are sequentially subjected to analog/digital conversion based on instructions from the AFE control block 44.

Thereafter, the image signals which were converted into the digital signals may be stored in the image memory of the RAM 31, and emphasis processing or smoothing processing may be applied to the image signals by the image processing program 32c. For example, when the copying function is then used, printing may be performed using the image data to which the emphasis processing or the smoothing processing already was applied. Similarly, when the scanning function then is used, the image data to which the emphasis processing or the smoothing processing already was applied may be transmitted to a PC or the like via the external connection unit 25. Still similarly, when the FAX function is used, the image data to which the emphasis processing or the smoothing processing already was applied may be transmitted.

Figure 7:
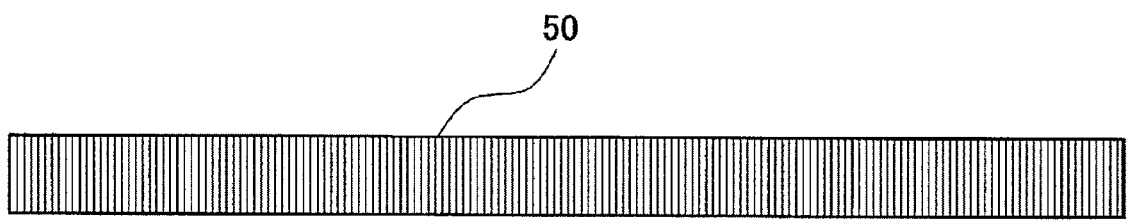
FIG. 7 is an explanatory view of an MTF detection pattern.

Referring to FIG. 7, in order to calculate the MTF to calibrate the image reader prior to shipping, an MTF detection pattern 50 to which a predetermined geometrical pattern is applied, e.g., a stripe band may be preliminarily prepared. Specifically, the MTF detection pattern 50 may be read by the close-contact-type image sensor 21, and image signals may be removed. Thereafter, the MTF may be calculated based on the obtained image signals. For example, using the maximum value and the minimum value of the image signals, the calculation program 32a may calculate MTF using the formula $MTF=(max-min)/(max+min)$.

Referring to FIG. 8, the contrast of image signals in a center region of the light receiving elements 20 may be substantial. Therefore the MTF of image signals in a center region of the light receiving elements 20 also may be substantial. In contrast, regions of light receiving elements other than the center region may not have significant contrast.

Figure 9A:
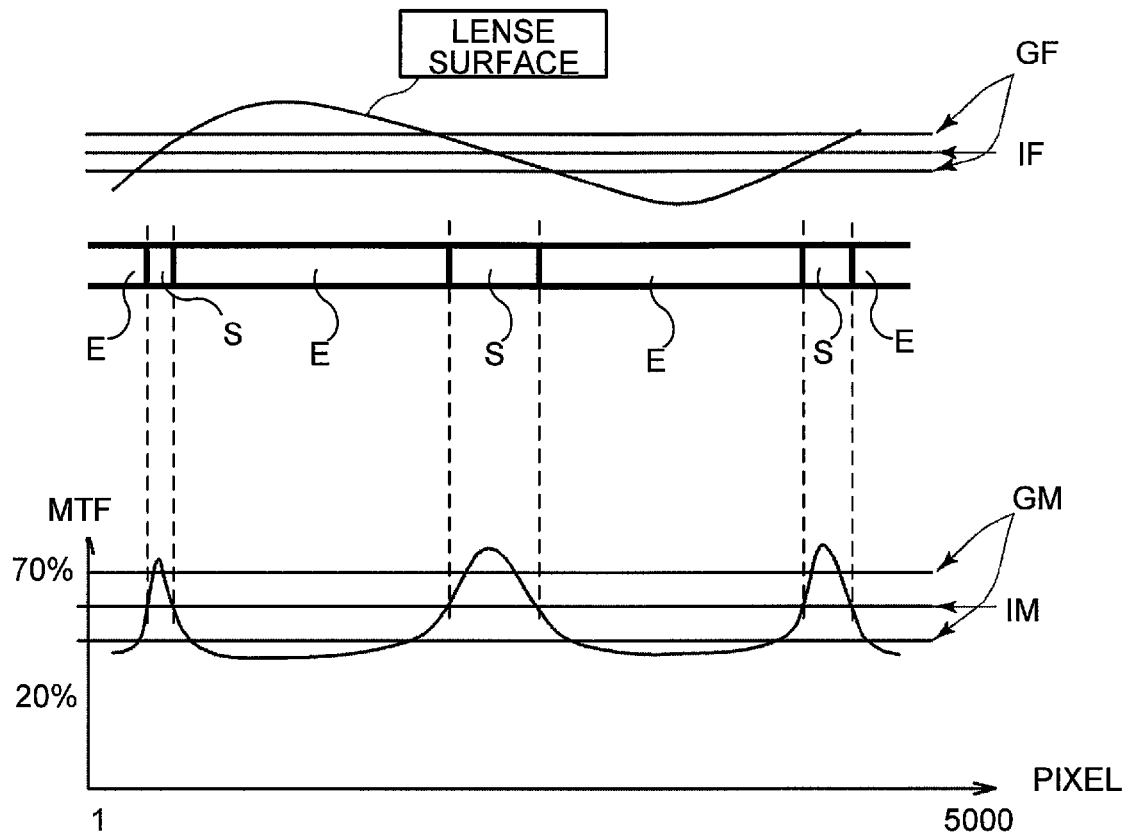
FIG. 9 is an explanatory view of an MTF recognition value distribution chart.

If frame 4a were to warn, a portion closer to the ideal focusing position IF exhibits an ideal MTF, but a portion away from the ideal focusing position IF exhibits non-ideal MTF. Referring to FIG. 9A, a focused image is obtained within a focusing region between two focusing end positions GF. In the example shown in FIG. 9A, accurate focusing is obtained at a center and at both ends of the close-contact-type image sensor 21, nevertheless, inaccurate focusing occurs at portions between the center and both ends of the close-contact-type image sensor 21.

In this embodiment, although the first predetermined value and the second predetermined value may be different within the focusing region between the two focusing end positions GF, an ideal MTF value IM corresponding the ideal focusing position IF may be predetermined for the first predetermined value and the second predetermined value. If image Processing Program 32c were to divide the region into a relatively small MTF region where the MTF is less than the ideal MTF value IM, and a relatively large MTF region where the MTF is greater than the ideal focusing value, the processing time may be significant. Therefore, in an embodiment of the present invention, the light receiving elements may be preliminarily divided into a plurality of blocks, and the determination of whether the region is the relatively large MTF region or the relatively small MTF region may be performed for each block unit, which may shorten the processing time.

Figure 9B:
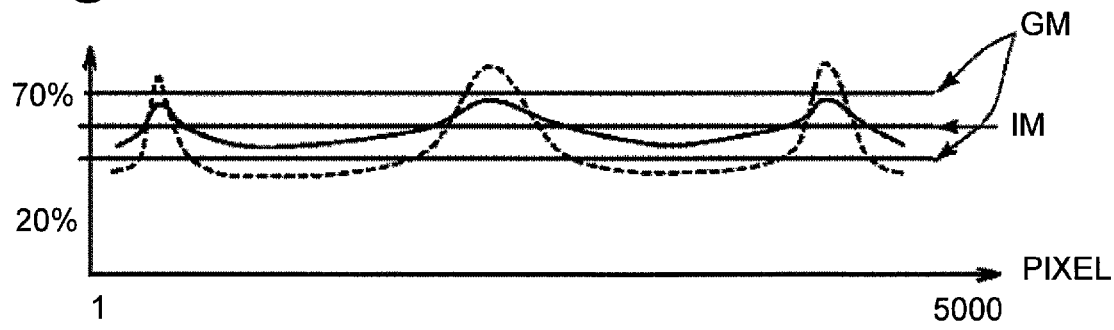

After dividing the region into the relatively large MTF region and the relatively small MTF region, the emphasis processing may be applied to the image signals E which are outputted from the light receiving elements 20 in the relatively small MTF region, and the smoothing processing may be applied to the image signals S which are outputted from the light receiving elements 20 in the relatively large MTF region. In this manner, as shown in FIG. 9B, in all of the light receiving elements 20, the MTF comes into the focusing range between two MTF values GM. Further, the difference between the MTF of the relatively large MTF region and the MTF of the relatively small MTF region decreases, and consequently the resolution may become uniform.

Referring to FIGS. 10a through 10c, to apply the emphasis processing or the smoothing processing, a filter may be preliminarily prepared, and an arithmetic operation may be performed using the filter and the pixel data values, e.g., image signals outputted from the light receiving elements 20 of the close-contact-type image sensor 21. The degrees of emphasis and smoothness may be altered by changing the numerical values of the filters. In one embodiment, a 3×3 filter is used, however, a 5×5 filter, a 7×7 filter, or the like may be used.

In an embodiment of the present invention, a plurality of different emphasis processes may be applied to the relatively small, e.g., a MTF region. That is, plurality of different filters having different emphasis may be used.

In an embodiment, the calculation of MTF may be performed when the multi-function machine 1 is manufactured. Alternatively, a user may execute the procedure for calibration after the multi-function machine 1 is manufactured.

Figure 13:
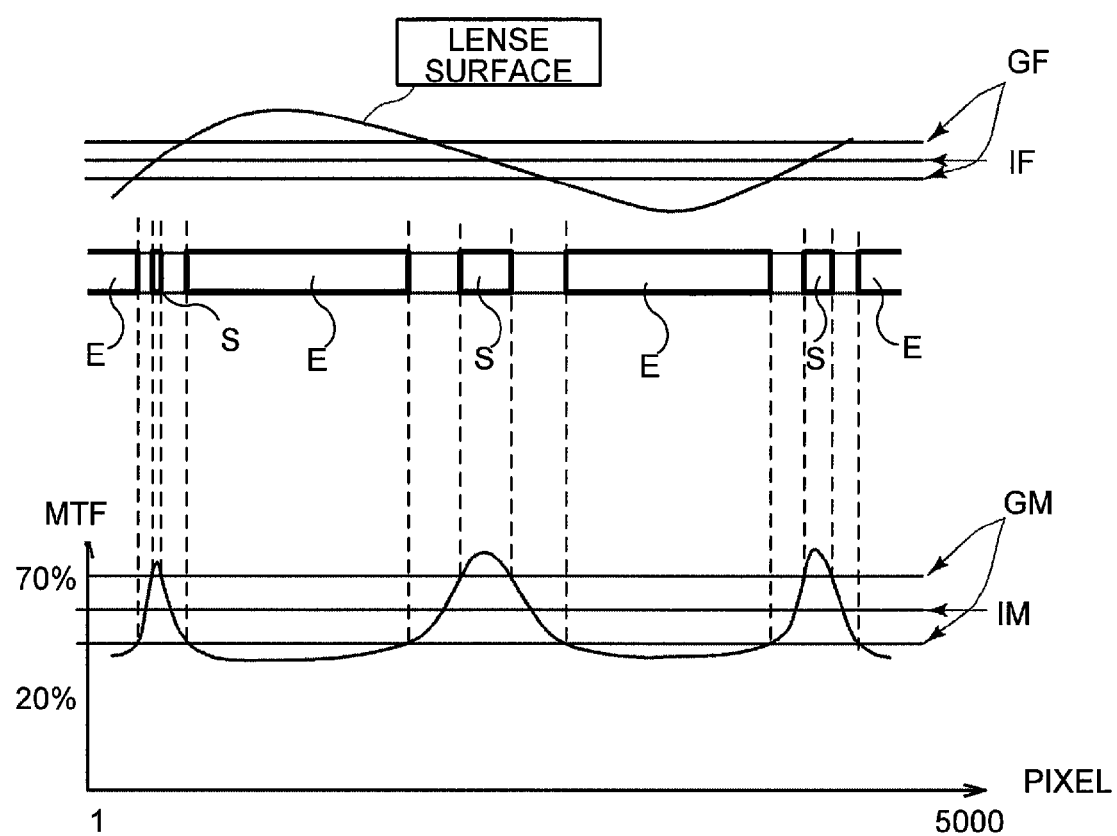
FIG. 13 is an explanatory view of another MTF recognition value distribution chart.

Referring to FIG. 9A, the first predetermined value and the second predetermined value may be the same ideal MTF value IM. Alternatively, the first predetermined value and the second predetermined value may be different from each other and within the range between two limit MTF values GM. FIG. 13 shows an example in which the first predetermined value and the second predetermined value are greater than the two limit MTF values GM and are less than the two limit MTF values GM, respectively. Similar effects may be obtained even in this condition.

While the invention has been described in connection with exemplary embodiments, it will be understood by those skilled in the art that other variations and modifications of the exemplary embodiments described above may be made without departing from the scope of the invention. Other embodiments will be apparent to those skilled in the art from a consideration of the specification or practice of the invention disclosed herein. It is intended that the specification and the described examples are considered merely as exemplary of the invention, with the true scope of the invention being indicated by the flowing claims.

What is claimed is:

1. An image reader comprising:
   an image sensor comprising a plurality of light receiving elements arranged in a main scanning direction, wherein the plurality of light receiving elements receive a reflection light from a document and perform a photoelectric conversion to convert the reflection light into a plurality of image signals;
   a Modulation Transfer Function (MTF) calculation portion which calculates an MTF of the image sensor based on image data which is obtained by reading a predetermined MTF detection pattern by the image sensor; and
   an image processing portion which, based on the MTF calculated by the MTF calculation portion, divides the plurality of light receiving elements into a first MTF region in which the MTF of the light receiving elements positioned in the first MTF region is greater than a first predetermined MTF value and a second MTF region in which the MTF of the light receiving elements positioned in the second region is less than a second predetermined MTF value, and performs a first image process on the plurality of image signals which are outputted from the light receiving elements in the first MTF region and a second image process on the plurality of image signals which are outputted from the light receiving elements in the second MTF region.

2. The image reader of claim 1, wherein the image sensor comprises a close-contact-type image sensor.

3. The image reader of claim 1, wherein the second image process comprises an emphasis image process.

4. The image reader of claim 1, wherein the first image process comprises a smoothing process.

5. The image reader of claim 3, wherein the first image process comprises a smoothing process.

6. The image reader of claim 1, further comprising a frame which holds the image sensor, wherein the frame comprises a resin.

7. The image reader of claim 1, wherein the plurality of light receiving elements are arranged in a line, and a length of the line is greater than or equal to 297 mm.

8. The image reader of claim 1, wherein the light receiving elements are divided into a plurality of blocks of light receiving elements, and the image processing portion determines whether each block is included in the first MTF region or the second MTF region.

9. The image reader of claim 3, wherein the image processing portion divides the second MTF region into a plurality of sub-divided second MTF regions, and a degree of emphasis associated with the emphasis process performed on each of the plurality of sub-divided second MTF regions is based on the MTF associated with the sub-divided second MTF region.

10. The image reader of claim 4, wherein the image processing portion divides the first MTF region into a plurality of sub-divided first MTF regions, and a degree of smoothing associated with the smoothing process performed on each of the plurality of sub-divided second MTF regions is based on the MTF associated with the sub-divided second MTF region.

11. The image reader of claim 5, wherein the image processing portion divides the second MTF region into a plurality of sub-divided second MTF regions, and a degree of emphasis associated with the emphasis process performed on each of the plurality of sub-divided second MTF regions is based on the MTF associated with the sub-divided second MTF region, and the image processing portion divides the first MTF region into a plurality of sub-divided first MTF regions, and a degree of smoothing associated with the smoothing process performed on each of the plurality of sub-divided second MTF regions is based on the MTF associated with the sub-divided second MTF region.

12. The image reader of claim 1, wherein the first predetermined MTF value is equal to the second predetermined MTF value.

13. A method of calibrating an image reader which is configured to read an image from a document, the method comprising the steps of:
   receiving, at a plurality of light receiving elements of an image sensor, a reflection light from the document;
   performing a photoelectric conversion to convert the reflection light into a plurality of image signals;
   reading a predetermined Modulation Transfer Function (MTF) detection pattern by the image sensor;
   calculating an MTF of the image sensor based on an image data corresponding to the predetermined MTF detection pattern;
   dividing the plurality of light receiving elements into a first MTF region in which the MTF of the light receiving elements positioned in the first MTF region is greater than a first predetermined MTF value and a second MTF region in which the MTF of the light receiving elements positioned in the second MTF region is less than a second predetermined MTF value;
   performing a first image process on the plurality of image signals which are outputted from the light receiving elements in the first MTF region; and
   performing a second image process on the plurality of image signals which are outputted from the light receiving elements in the second MTF region.

14. The method of claim 13, wherein the first predetermined MTF value is equal to the second predetermined MTF value.

15. The method of claim 13, wherein the second image process comprises an emphasis image process.

16. The method of claim 13, wherein the first image process comprises a smoothing process.

17. The method of claim 15, wherein the first image process comprises a smoothing process.

18. The method of claim 13, wherein the image sensor comprises a close-contact-type image sensor.

* * * * *